United States Patent Office 3,273,944
Patented Sept. 20, 1966

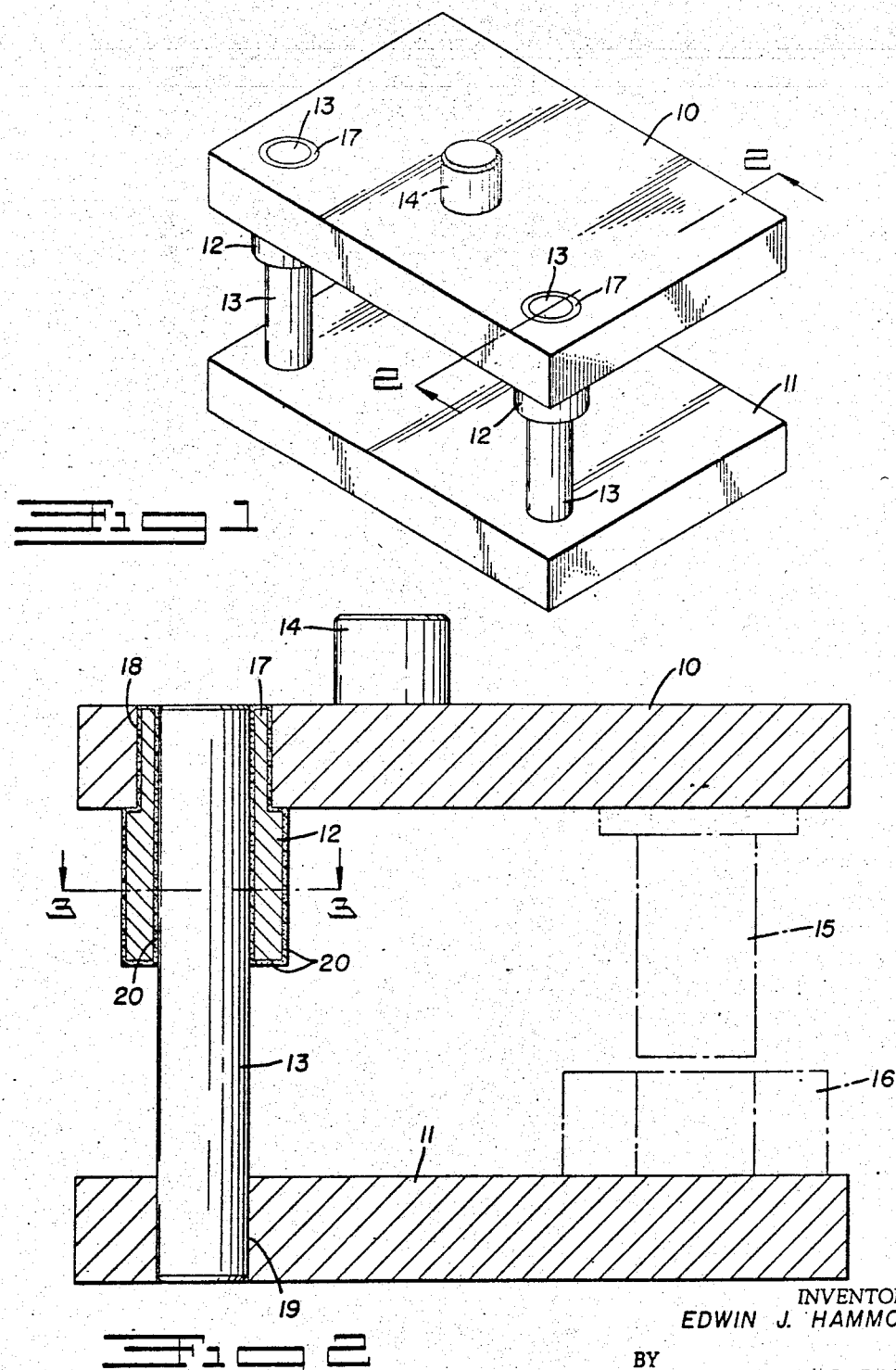

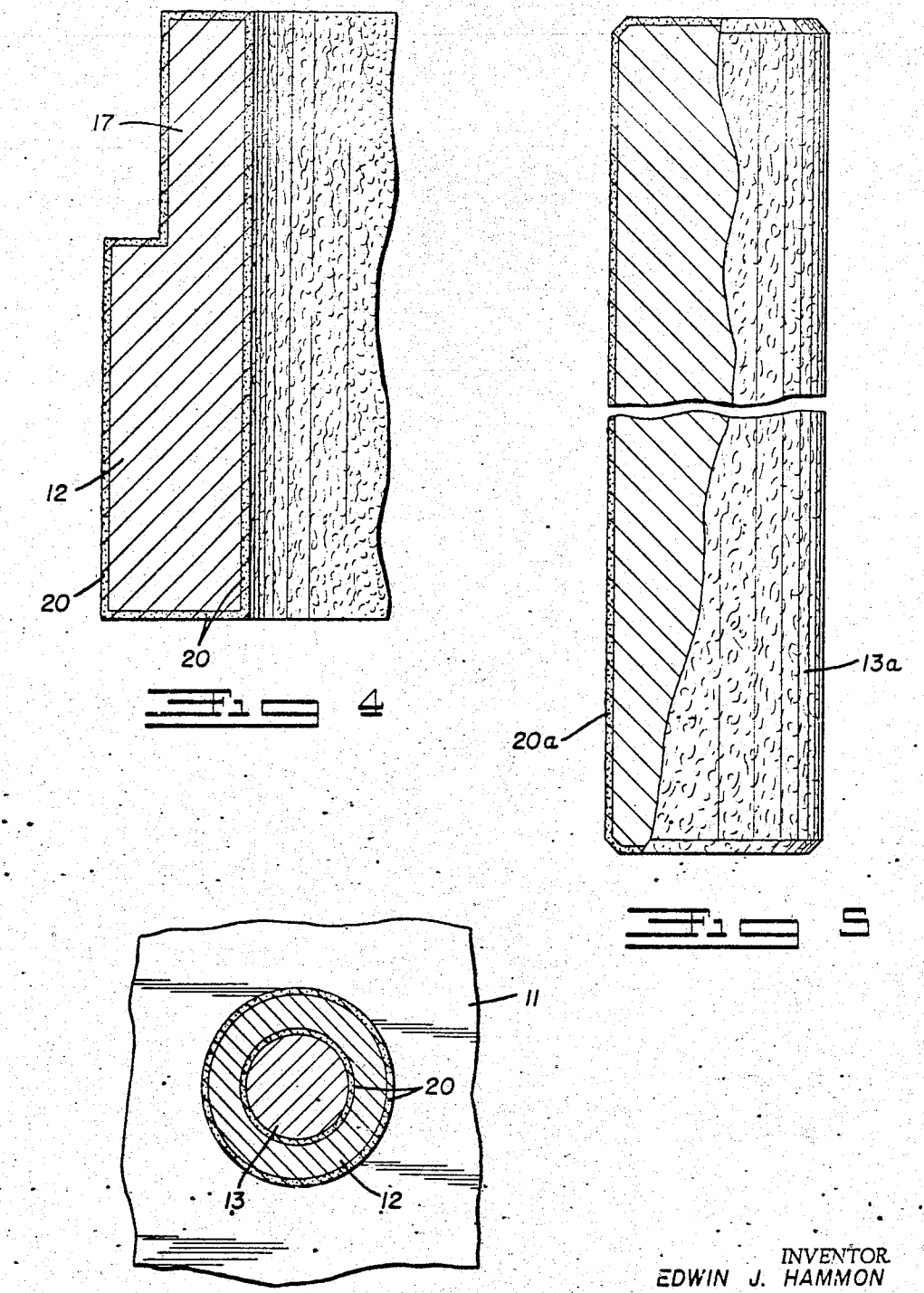

3,273,944
DIE SET HAVING ALUMINUM OXIDE BEARING SURFACE
Edwin J. Hammon, Bedford Heights, Ohio, assignor to Fountainhead Industries, Inc., Maple Heights, Ohio, a corporation of Ohio
Filed Oct. 2, 1963, Ser. No. 313,331
6 Claims. (Cl. 308—4)

The present invention relates generally to apparatus having die or mold-supporting parts arranged for relative guided reciprocating movement toward and from one another, such as die sets, mold bases and machine presses used in the stamping, drawing, molding or casting of various metals, plastics and other materials. More specifically, the present invention deals with an improved die set of the so-called "friction" type, wherein the relatively connecting and telescoping guide pin and bushing members of the die set are operable under conditions where prior art die sets would normally fail due to speed of operation, close tolerances, misalignment, high temperatures of inadequate lubrication, and wherein the pin and bushing members are electrically insulated from one another by a hard, dielectric layer or coating of a nonmetallic material, such as amorphous aluminum oxide.

Present day die sets fall into two general classifications, namely: the plain bushing, friction type and the ball bearing, antifriction type. Generally, the ball bearing or antifriction type die set is considered mechanically superior to the so-called plain bushing, friction type die set, and is especially adaptable for high speed press operations, or where extreme accuracy of alignment of the mating die parts is required. However, ball bearing, antifriction die sets are comparatively more expensive than the so-called plain bushing, friction type die sets, and for this reason, the friction type die set represents the greater majority of die sets in present day usage.

The so-called friction type die set comprises generally a pair of opposed, relatively reciprocative, punch and die supporting plates which are movably interconnected by sets of relatively telescoping guide pins and bushings, and wherein the relatively engaging, bearing surfaces of the pins and bushings are machined to comparatively close tolerances for the intended purpose of maintaining the plates and die parts supported thereon in substantially exact alignment during normal opening and closing movement of the die set. Generally, in friction type die sets, the guide pins are formed from a hardened and polished and/or chrome plated steel, while the bushings are formed either from a hardened and polished steel, from all bronze, or from a steel tube having a bronze plated, inner bearing surface or sleeve therein. In all cases, it is essential that the bearing surfaces between the pins and bushings be continuously lubricated. However, it has been found that friction type die sets utilizing hardened steel pins and bushings are highly susceptible to extreme wear, galling, and seizure, due to friction and heat generated in such parts even during moderately high speed press operation. This situation is naturally aggravated in installations where, due to misalignment of the press platen and bolster of the press, or imbalance of forces in the associated workpiece, the pins and bushings of the die set are subjected to forces which tend to misalign the axes thereof. While the use of bronze plated or all bronze bushings tends to reduce galling and seizure between the pin and bushing components, the latter types of bushings are comparatively more expensive than the hardened steel bushings and ordinarily wear even faster than the hardened steel bushings.

As will be readily understood by the experienced die maker, extreme wear, galling, or seizure of the pin and bushing members of a die set oftentimes results in extensive damage or even total destruction of a set of dies mounted in the die set with consequent high costs of repair or replacement of both the die set and the die parts carried therein.

Also, with the advent of the now well-known, various electrical discharge and electrochemical "machining" of die parts, it has become necessary to provide some means for electrically insulating or isolating the respective plates or shoe members of a die set from one another during such operations to prevent undesired electrical activity between the electrode and the workpiece. Toward this end, it has been previously proposed to interpose dielectric sleeves, caps or washers between the guide pins and/or bushings and their associated plates or shoes and thereby electrically insulate one of the plates or shoes from the other. However, the use of dielectric sleeves, caps or washers between the pins and/or bushings and their associated die and punch supporting plates presents numerous manufacturing difficulties and results in a substantial increase in the cost of such die sets as compared with a conventional, noninsulated die set. Further, the dielectric members of the so-called insulated or dielectric die sets, due to technical or economical limitations, are generally used only during the electromachining process, and following the electromachining operation, the mating punch and die members are usually either transferred to another conventional type die set, or at least the dielectric members of the die set are replaced by the corresponding components of a conventional, noninsulated die set before the punch and die members are used in repetitive press operations. This changeover from an insulated to a noninsulated die set necessitates an accurate realignment and remounting of the punch and die members with resultant loss of time.

It is, therefore, a principal object of the present invention to provide a comparatively inexpensive, friction-type die set which is characterized by improved mechanical, dielectrical and chemical properties and which, due to its dielectric properties, may be used in electromachining operations as well as in repetitive work forming operations without requiring any dismantling, replacement or substitution of component parts of the die set.

Another object of this invention is to provide a die set embodying the usual, relatively reciprocable punch and die-supporting plates or shoes which are interconnected for relative and accurately guided reciprocation by means of relatively telescoping guide pins and bushings, but wherein the bearing surfaces of either the guide pins or bushings of the die set are defined by an extremely hard, wear resistant, dielectric layer of a nonmetallic material, such as amorphous aluminum oxide.

A further object of this invention is to provide a die set which utilizes comparatively less expensive component parts, due to fewer and simpler manufacturing operations required in their fabrication than heretofore known types of die sets.

A still further object is to provide a die set in which either the guide pin or bushing components thereof are provided with a bearing surface defined by a layer or coating of a nonmetallic material which is comparatively hard, abrasion-resistant, porous, self-lubricating, non-galling, antiseizing and ductile, which is extremely adherent to its supporting structure and will not peel or flake therefrom, which is corrosion resistant, dielectric and nonmagnetic, which possesses a relatively low coefficient of friction, and which may be economically applied to or formed on its supporting structure in a manner to provide for uniformity and close control of thickness, and control of surface texture.

Another object is to provide a comparatively lightweight die set which, due to its reduced weight, facilitates die-mounting procedures, shipping, portability, and substantially reduces inertial effects during operation of the die set.

These and numerous other objects and advantages will become more readily apparent by reference to the following description and the accompanying drawings, wherein:

FIG. 1 is a perspective view of one type of die set embodying the present invention;

FIG. 2 is an enlarged vertical sectional view taken through one of the guide pin and bushing assemblies of the die set along a plane indicated by the line 2—2 of FIG. 1;

FIG. 3 is a horizontal sectional view taken along the line 3—3 of FIG. 2;

FIG. 4 is a still further enlarged, fragmentary vertical sectional view taken through a die set bushing formed in accordance with this invention and illustrating in exaggerated manner the external layer of aluminum oxide;

FIG. 5 is a view similar to FIG. 4, but showing a guide pin having an amorphous aluminum oxide bearing surface in accordance with this invention.

This invention is predicated upon the discovery that a layer or coating of predetermined thickness of a nonmetallic material, such as amorphous aluminum oxide, provides an excellent wear resistant, dimensionally stable, dielectric bearing surface between the relatively reciprocating guide pin and bushing members of a die set. Ordinarily, aluminum oxide is looked upon as a well-known abrasive material, and one which would not ordinarily be expected to provide a desirable bearing surface between relatively close fitting yet moving parts. However, it has been found that a more economical, highly superior die set bushing or guide pin may be formed from an aluminum alloy material which is first machined to proper dimensions and thereafter subjected to a controlled anodization process which produces an extremely hard, wear resistant, and dielectric surface layer upon the bushing or pin. As a result of the anodization process, the external surfaces of an aluminum die set bushing or guide pin are converted by electrochemical reaction to amorphous aluminum oxide, and the anodization process may be carried out in a manner to provide a uniform layer of amorphous aluminum oxide having a total thickness or depth ranging from 0.0001 inch to 0.0150 inch, and preferably between 0.001 and 0.004 inch, and most desirably 0.002 to 0.003 inch, in order to provide the desired wear-resistance and dielectric properties necessary to an efficient so-called insulated die set. Most of the machining of the bushing or pin is preferably accomplished prior to the anodizing process. The anodization process may be controlled to produce various degrees of smoothness of surface from one nearly equal to the initial surface of the unprocessed workpiece, to one having a surface finish which by touch and sight resembles the outer surface of an orange peel.

Referring now to the drawings FIG. 1 discloses an assembled die set comprising upper and lower plates or shoes 10 and 11, respectively. Press fitted in or otherwise suitably secured to the upper plate 10 are a pair of depending, tubular, cylindrical guide bushings 12 which telescope and slidably receive a pair of upstanding, cylindrical guide pins 13 which are press fitted in, or otherwise suitably rigidly secured to the lower plate 11. The upper plate 10, as shown, is provided with a relatively short, upstanding cylindrical shank 14 which is adapted to be gripped or otherwise secured in the movable platen of a press, not shown, while the lower plate or shoe 11 is adapted, in the usual manner, for connection to the relatively stationary bed of a press, not shown. As will be understood, the upper and lower plates or shoes 10 and 11 of the die set are intended to support a pair of cooperative punch and die members, and to maintain such punch and die members in relatively exacting alignment during operation of the press, whereby the mating surfaces of the punch and die members may be brought into the desired, close tolerance, mating engagement to perform the desired punching, or forming operation upon an associated workpiece positioned therebetween.

In FIG. 2 of the drawings, a typical punch member 15 is illustrated in broken lines as being carried in depending relation to the upper plate or shoe 10 of the die set, while a typical female die 16 has been illustrated as being supported upon and carried by the lower plate or shoe 11 of the die set. It will here be understood that the punch and die members 15 and 16 may be secured to their respective plates or shoes in any suitable manner which will provide exacting, axial alignment between the punch and die members. Preferably, the punch and die members 15 and 16 are accurately located and secured to the respective plates or shoes of the die set, such as by means of dowels and cap screws or the like. The punch and die members 15 and 16 are normally centrally oriented or arranged on the respective plates 10 and 11 of the die set so as to impart uniform or balanced forces on the pin and bushing member. In FIG. 2, however, it will be noted that the punch and die members 15 and 16 have been deliberately shown in offcenter or unbalanced position to illustrate the ability of the bushings 12 and pins 13 to withstand relatively extreme imbalance of forces without detrimental wear, all of which would be substantially impossible with a conventional friction-type die set of the prior art. It will also be understood that the relative positions of the punch and die members 15 and 16 may be reversed as between the upper and lower shoes of the die set when such arrangement is desirable in the punching or forming of any particular workpiece.

As illustrated in FIGS. 2 and 3, the guide bushings 12 are preferably formed with a relatively reduced diameter upper end portion 17 which is securely fitted into cooperatively sized cylindrical openings or bores 18 formed in the upper plate or shoe 10 toward the rearward corners thereof. The lower portions of the bushings 12 extend downwardly in depending relationship to the under surface of the upper plate 10 to telescopically receive the upper end portion of the guide pins 13, whose lower ends are likewise securely fitted into cooperatively sized openings 19 formed in the lower plate or shoe member 11. Thus, as the upper plate or shoe member 10 is reciprocated toward and away from the relatively stationary lower plate or shoe member 11, during operation of the associated press, the guide bushings and pins function to maintain the punch and die members 15 and 16 in exacting mating alignment, and limit undesired relative displacement of the punch with respect to the die member, other than normal reciprocating movement thereof.

In accordance with the present invention, the guide bushings 12 of the die set may be formed from a suitable aluminum alloy, such as 7075-T6 aluminum alloy which, prior to its assembly in the upper shoe 10, is suitably machined to desired dimensions and thereafter subjected to controlled electrochemical anodization to from on all external surfaces thereof, including particularly its inside diameter, a layer of amorphous aluminum oxide (alumina). This external layer or coating of amorphous aluminum oxide is illustrated in exaggerated form in FIG. 4 of the drawings, and is designated by reference numeral 20. As will be noted in FIG. 4, the layer 20 of amorphous aluminum oxide is characterized by a relatively minutely dimpled, orange peel surface which is in sharp contrast to the usual highly polished smooth bearing surfaces of the conventional steel or bronze die set bushing. At the same time, the layer 20 of amorphous aluminum oxide provides an extremely hard, wear resistant bearing surface approximating a Rockwell hardness of the order of C65. At the same time, the external layer 20 of amorphous aluminum oxide provides an excellent dielectric barrier between the bushings 12, the guide pins 13, and the upper plate 10 of the die set, without necessitating the use of additional dielectric sleeves, caps, or washers to insulate the bushing from the upper plate number 10 and punch member 15 of the die set. In addition to its wear resistant and dielectric properties, the layer 20 provides a bearing surface which is an integral, adherent part of the parent metal of the bushing and which is nonpeeling, nonflaking, nongalling, antiseizing, ductile, corrosion resistant, nonmagnetic and less expensive to produce than a chrome plated surface.

Additionally, the layer 20 may be of relatively open or porous structure, as compared to steel or bronze, and if lubricated with a normally liquid lubricant, such as oil or grease, it "soaks" in and gradually "gives off" the lubricant, such that the relatively constant adding of a supply of lubricant, as required in prior art die sets, is eliminated. Further, solid lubricants or materials having extremely low coefficients of friction, such as powdered nylon or graphite, may be impregnated into the surface of the layer 20 to provide a relatively permanently lubricated bearing surface, such as is impossible with conventional steel or bronze bearing surfaces. In the use of solid lubricants, the open or porous structure of the layer 20 acts as a matrix to physically bind and retain the solid lubricant therein.

In representative tests performed with die sets formed in accordance with the present invention, it has been found that the present amorphous aluminum oxide coated aluminum bushings will operate up to ten times as long as conventional steel or bronze die set bushings, without appreciable wear, galling or seizure. Further, the present dielectric bushings are substantially self-lubricating, and while it has been found desirable to initially lubricate the bearing surfaces of the pins and bushings prior to the operation of the die set, subsequent and continued lubrication is entirely unnecessary. This is in direct contrast to the usual steel or bronze bushings which require continuous lubrication during operation of the die set to reduce their tendency toward galling and seizure. Also, by actual tests, it has been found that frictional heat is materially reduced in the present anodized aluminum bushings as compared with the frictional heat produced in conventional steel and bronze bushings, with all tolerances being equal. Again, a distinct advantage of the present anodized aluminum bushings resides in their corrosion resistant and nonmagnetic properties which are directly attributable to the outer layer of amorphous aluminum oxide.

The guide pins 13 used in combination with the present amorphous aluminum oxide coated bushings are preferably formed from hardened, highly polished and hard chrome plated steel or other substantially aluminum free metal in the conventional manner. Thus, the present die sets may provide hard chrome to aluminum oxide bearing surfaces between the guide bushings 12 and pins 13.

However, it has been found that the purposes of the present invention may be effected by utilizing an anodized aluminum alloy pin in combination with a conventional steel, bronze or bronze coated steel bushing. This alternative is illustrated in FIG. 5 of the drawings, wherein a guide pin 13a is formed from an aluminum alloy of the type previously indicated, which has been subjected to controlled anodization to produce a uniform outer surface layer 20a composed of amorphous aluminum oxide which may have a total thickness or depth ranging from 0.0001 to 0.0150 inch, and preferably, between 0.001 and 0.004 inch, but most desirably between 0.002 and 0.003 inch. It will here be understood that die sets utilizing guide pins 13a of the type illustrated in FIG. 5, that is aluminum alloy guide pins having a surface coating or layer of amorphous aluminum oxide, will be employed only in combination with steel, all bronze, or bronze plated, or other substantially aluminum-free metallic bushings, rather than in combination with aluminum alloy bushings having the external surfaces thereof covered with a layer of amorphous aluminum oxide, as previously described in connection with FIGS. 1 through 4 of the drawings. Accordingly, it will be understood that either the guide pins or bushings of the die set may be formed of anodized aluminum alloy, but not both such members.

In the fabrication of either the bushings or the pins from aluminum alloy, the pin or bushing blanks are first machined in a conventional manner to their proper sizes and configurations, and during machining, are preferably subjected to ball burnishing. Following the machining of the pins or bushings to desired size, they are then subjected to a chemical cleaning operation to remove harmful foreign matter from the external surfaces thereof and then subjected to a controlled anodization process to form on the outer surfaces thereof a layer of amorphous aluminum oxide having a desired, predetermined total thickness. In the anodization process, the pin or bushing is electrically attached, preferably at a plurality of points, to the anode of an electrochemical anodizing apparatus, and is then placed in an electrolytic bath containing both organic and inorganic acids and preferably maintained at a temperature between 0° F. and 35° F., and subjected to electrolysis for a controlled period of time to produce thereon the desired thickness of amorphous aluminum oxide. Preferably, the electrolysis is carried out using a bath temperature of approximately 15° F. and by progressively increasing the voltage of the electrical current passing through the electrolyte bath from approximately 15 to 150 volts while maintaining a current density insufficient to cause burning of the workpiece (preferably below 20 amperes per square foot). Depending upon the thickness of the layer of amorphous aluminum oxide which is desired, the anodization process may be carried out in from 30 to 90 minutes. In the anodization process, a uniform, highly adherent layer of amorphous aluminum oxide is developed by a combined penetration and external growth. In other words, in the electrochemical reaction, the layer of amorphous aluminum oxide extends approximately equal distances inwardly and outwardly from the original surface of the aluminum alloy workpiece. Thus, in the machining of the pin or bushing, prior to the anodization process, it is desirable to take into account the growth or buildup of amorphous aluminum oxide which results from the anodization process, in order to attain the desired and predetermined close tolerances between the outer diameter of the guide pin and the inner diameter of the guide bushing of the finished die set. However, due to the exactness with which the thickness of the layer of aluminum oxide may be controlled during the anodization process, comparatively wider tolerances in the premachining of the unprocessed workpiece are permitted with consequent time and labor savings. The exacting dimensional control over the thickness of aluminum oxide produced during the anodization process enables the manufacturer to salvage many bushings or pins which would otherwise be scrapped, due to failure to maintain relatively close tolerances in the premachining of such parts.

Returning now to the drawings, and particularly to FIGS. 1 and 2, it will be understood that while the bushings 12 have been illustrated as being formed from aluminum alloy having an outer surface layer of amorphous aluminum oxide thereon, and while the associated pins 13 are illustrated as being formed from a hardened and polished and/or hard chrome plated steel, it is entirely within the scope of this invention to reverse such an arrangement by substituting the anodized aluminum alloy guide pins 13a, as shown in FIG. 5, for the steel guide pins 13, and by substituting a conventional bushing for the anodized aluminum alloy bushing 12 as shown in FIG. 2. Also, as will be readily apparent to anyone skilled in the art, the positional arrangement of the bushings 12 and pins 13 may be reversed, that is, by connecting the pins 13 to the upper plate or shoe 10 and the bushings 12 to the lower plate or shoe 11. Such modifications would be obvious to anyone skilled in the art, and are entirely within the scope of the present invention as defined by the appended claims. It will also be noted that due to the so-called "self-lubricating" or "lubricant-retaining" properties of the amorphous aluminum oxide bearing surfaces of the present die sets, it is entirely unnecessary to provide the usual oil grooves, lubricant passages and/or lubricant fittings common to prior art die sets.

In view of the foregoing, it will be seen that the present invention comprehends an improved die set in which either the guide pin or bushing elements are formed or otherwise provided with a nonmetallic, bearing surface composed of amorphous aluminum oxide. Guide pins or bushings formed in accordance with the present invention are characterized by their extreme resistance to wear and corrosion and their nonmagnetic, nongalling, antiseizing, and dielectric properties, and a greatly reduced cost of manufacture as compared with conventional steel, bronze or bronze plated die set bushings and pins. A further advantage of the present die sets resides in the so-called self-lubricating properties possessed by the amorphous aluminum oxide bearing surface of the pins or bushings, and the consequent ability of such pins or bushings to operate at comparatively high speeds without requiring constant lubrication. Yet another advantage of the present die sets resides in the inherent ability of the anodized aluminum alloy pins or bushings to minimize heat absorption, to quickly and efficiently dissipate heat absorbed, and to maintain dimensional stability better than conventional steel, all bronze or bronze-coated die set bushings or pins without galling or seizure.

While certain preferred embodiments of the present invention have been illustrated and described in detail, it will be understood that the same is susceptible to various modifications as to details of construction and design without departing from the spirit of the invention or the scope of the following claims.

Having thus described this invention, what is claimed is:

1. A die set comprising a pair of punch and die-supporting plates arranged for relative movement toward and from one another; a plurality of relatively spaced apart, substantially aluminum-free metal, guide pins carried by and projecting outwardly from one of said plates; a plurality of relatively spaced apart, tubular guide bushings carried by the other of said plates and telescoping said guide pins; and a layer of amorphous aluminum oxide carried by each of said bushings and defining a bearing surface for each of said pins.

2. In a die set comprising a pair of punch and die-supporting members arranged for relative movement toward and from one another, a metal guide-pin carried by and projecting outwardly from one of said members and a bushing of different metallic composition than said guide pin carried by the other of said members and telescoping said guide pin; that improvement which comprises a layer of amorphous aluminum oxide interposed between said pin and bushing and having a thickness of at least about 0.001 inch.

3. In a die set; a pair of punch and die-supporting members arranged to reciprocate toward and from one another; relatively telescoping pin and bushing elements carried by and extending between said members for guiding said members during relative reciprocation, said pin and bushing elements being of different metallic composition; and a coating of amorphous aluminum oxide carried by one of said pin and bushing elements and providing a bearing surface for the other of said elements.

4. A die set as defined in claim 3, wherein said coating of amorphous aluminum oxide possesses a thickness of at least about 0.001 inch.

5. Apparatus of the class described comprising a pair of opposed plates arranged for relative reciprocation toward and from one another and adapted to support thereon relatively mating die parts; relatively telescoping guide pin and bushing members of respectively different metallic composition carried respectively by said plates for guiding the latter during relative reciprocation thereof; and a dielectric coating of amorphous aluminum oxide carried integrally by one of said pin and bushing members and providing a bearing surface for the other of said members.

6. A die set as defined in claim 5, wherein said coating of amorphous aluminum oxide possesses a thickness of from 0.001 inch to 0.004 inch.

References Cited by the Examiner

UNITED STATES PATENTS

| | | | |
|---|---|---|---|
| 1,526,127 | 2/1925 | Flick | 308—241 X |
| 1,661,448 | 3/1928 | Taylor | 308—241 X |
| 1,869,412 | 8/1932 | De Vore | 308—241 |
| 1,998,888 | 6/1935 | Wallgren | 308—237 |
| 2,386,951 | 10/1945 | Howe | 29—149.5 |
| 2,673,131 | 3/1954 | Kistler | 308—237 X |
| 2,696,413 | 12/1954 | Wheildon | 308—4 |
| 2,760,925 | 8/1956 | Bryant | 308—241 X |
| 2,909,832 | 10/1959 | Cousino | 29—149.5 |
| 3,007,746 | 11/1961 | Moyer | 308—4 |
| 3,039,829 | 6/1962 | Onulak | 308—4 |
| 3,070,404 | 12/1962 | Moyer | 308—4 |

FOREIGN PATENTS 369,059  3/1932  Great Britain.

DAVID J. WILLIAMOWSKY, *Primary Examiner.*

DON A. WAITE, *Examiner.*

L. L. JOHNSON, *Assistant Examiner.*